(12) United States Patent
Pierson, Jr.

(10) Patent No.: US 6,558,190 B1
(45) Date of Patent: May 6, 2003

(54) METHOD AND SYSTEM OF AN INSTALLER-FRIENDLY, MODULARLY ADAPTABLE, ELECTRICAL, OUTLET GANG BOX

(75) Inventor: Forrest L. Pierson, Jr., Dallas, TX (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/695,124

(22) Filed: Oct. 24, 2000

(51) Int. Cl.[7] .............................................. H01R 13/60
(52) U.S. Cl. ...................................................... 439/535
(58) Field of Search ................................. 439/535, 107, 439/397; 174/53

(56) References Cited

U.S. PATENT DOCUMENTS

| | | | |
|---|---|---|---|
| 257,277 A | * | 5/1882 | Bergmann |
| 2,214,065 A | * | 10/1940 | Pennock |
| 2,430,011 A | * | 11/1947 | Gillentine |
| 2,751,568 A | * | 6/1956 | Despard |
| 2,828,394 A | * | 3/1958 | Mayzik |
| 2,908,743 A | * | 10/1959 | Premoshis |
| 2,920,303 A | * | 1/1960 | Johnson |
| 3,004,175 A | * | 10/1961 | Weiss |
| 3,157,732 A | * | 11/1964 | Richards |
| 3,167,375 A | * | 1/1965 | Sarazen |
| 3,189,863 A | * | 6/1965 | Leach |
| 3,482,263 A | * | 12/1969 | Ryder |
| 3,588,489 A | * | 6/1971 | Gaines |
| 3,609,647 A | * | 9/1971 | Castellano |
| 3,702,982 A | * | 11/1972 | Kelly et al. |
| 3,922,478 A | * | 11/1975 | Perkey |
| 4,117,258 A | * | 9/1978 | Shanker |
| 4,304,957 A | * | 12/1981 | Slater et al. |
| 4,352,537 A | * | 10/1982 | Guelden |
| 4,379,605 A | * | 4/1983 | Hoffman |
| 4,674,819 A | * | 6/1987 | Fujitani |
| 4,740,167 A | * | 4/1988 | Millhimes |
| 4,985,806 A | * | 1/1991 | Mazzullo et al. |
| 5,141,449 A | * | 8/1992 | Tieszen |
| 5,229,220 A | | 7/1993 | Stanton et al. |
| 5,425,659 A | | 6/1995 | Banks |
| 5,429,518 A | | 7/1995 | Chen |
| 5,471,012 A | * | 11/1995 | Opel |
| 5,648,712 A | | 7/1997 | Hahn |
| 5,729,436 A | * | 3/1998 | Yoshigi et al. |
| 6,010,347 A | * | 1/2000 | Lee |
| 6,045,399 A | | 4/2000 | Yu |
| 6,086,408 A | * | 7/2000 | Tanigawa |
| 6,172,428 B1 | | 1/2001 | Jordan |
| 6,201,187 B1 | * | 3/2001 | Burbine |

* cited by examiner

*Primary Examiner*—Neil Abrams

(57) ABSTRACT

An electrical box including a hollow container defining an interior space, as well as neutral and hot exterior connectors mounted on an exterior surface of the container, and ground, neutral, hot, and alternate hot interior conductive members mounted on an interior surface of the container which define a single circuit of the electrical box. The exterior connectors receive electrical power from a multi-conductor electrical cable and transfer the power to an electrical unit connected to the internal conductive members without the multi-conductor electrical cable entering the interior space of the electrical box. The exterior connectors are preferably insulation displacement connectors (IDCs) and are mounted to exterior bus bars that contain high current screw holes that, for alternative use, also accept high current wire connectors used where the electrical power is higher than the current capacity of the IDCs. The conductive members are preferably rigid conductive fingers attached to interior bus bars such that contacts of the electrical unit mate with the electrical box when the unit is installed in the box. When a plurality of single circuits are included in an electrical box, conductive tabs are provided to transfer electrical power from the interior bus bars of one circuit to the interior bus bars of another circuit. Two or more electrical boxes may be ganged together by manufacturing the boxes adjacent to one another, removing common interior walls and overlapping mounting lips, and providing removable jumper tabs that span from one box to an adjacent box.

14 Claims, 14 Drawing Sheets

METHOD AND SYSTEM OF AN INSTALLER-FRIENDLY, MODULARLY ADAPTABLE, ELECTRICAL, OUTLET GANG BOX

BACKGROUND OF THE INVENTION

1. Field of the Invention

The present invention relates to an electrical box for providing electrical power to a building, and more particularly relates to an electrical box that enables efficient electrical wiring of a building using highly reliable electrical connection methods.

2. Discussion of the Background

In providing electrical power to commercial and residential buildings, a main power line typically carrying 100–200 Amps of 220VAC single phase power enters the building from an electric company power grid and is connected to a service box that distributes power to the entire building. In the service box, the 220VAC power is center tapped with a neutral return to provide two 110VAC sources of opposite polarity and ground terminal connected to the earth.

In the service box, power from the main power line is divided into branch circuits each of which typically provides 110VAC power circuit breakered at 15 to 25 Amps to several plugs, switches, and/or other electrical units located in different areas of the building. In providing such branch circuits, multi-conductor electrical cable must be routed from a branch circuit breaker in the main service box to electrical boxes that contain each of the electrical units in the branch circuit. The multi-conductor cable used to route the branch circuits typically includes a white insulation neutral wire, a black insulation hot wire, and a bare or green insulation ground wire to carry 110VAC throughout the building. In branch circuits, in which 220VAC are used, a red insulation alternative hot wire is also provided in the multi-conductor cable, and higher currents are allowed for certain high power appliances, such as stoves, ovens, air conditioners, heaters and clothes dryers.

Current practice in wiring a branch circuit is to route individual segments of the multi-conductor electrical cable from the interior of one electrical box to the interior of a subsequent electrical box in the circuit. When all electrical boxes are connected with cable segments, the free ends of the cable segments at the interior of each box are connected to complete the branch circuit. In completing the branch circuit, the outer insulation sheathing is first stripped off of each free end of cable to expose the internal electrical wires, and the insulation is then stripped off of the end of each wire to expose the copper conductor of the wire. The bare conductors of each wire are then connected by use of twist-on connectors or by connecting the conductor to a switch, plug, or other electrical unit in the box and the cables are folded within the interior of the box to make room for the electrical unit.

Similarly, when a new load, such as an electrical outlet is added to an existing electrical circuit, wires of the existing circuit must be spliced into and reconnected by use of the added load. Specifically, in adding a load, the electrician must first cut an opening in the finished wall to reveal the existing electrical cable which is then cut to provide two ends of the cable which are inserted into an electrical box used for housing the electrical outlet to be added. In situations whereby the electrical cable is not long enough that the ends of the cable can reach the interior of the new electrical box, it may be necessary for the electrician to install at least one junction box to extend the ends of the cable. The ends of the cable are then prepared and the internal wires are stripped as described above. The wire ends are reconnected through the electrical unit in the box to complete the circuit, and the wires are folded into the new box as discussed.

These conventional methods of wiring a building, however, present a number of problems to the electrician and homeowner. First, from the standpoint of the electrician, the effort it takes to cut and route cable segments between electrical boxes, and then to strip-and reconnect the internal wires of the cable using the above-described method is very time consuming and labor intensive. In addition, in installing a new electrical outlet, existing wires may have to be extended by use of a junction box requiring extra time. In addition, because multi-conductor electrical cables have three or four individually insulated conductors bound together by an outer sheathing, the cable is stiff and difficult to fold into the electrical box in such a way that plugs, switches, and other electrical units will have enough room to fit in the box. This creates greater inefficiency and makes it difficult for the electrician to sufficiently align all of the plugs and/or switches in a multi-ganged box so that a cover plate can be placed over the electrical unit and box.

In addition to the above-described efficiency problems, a significant amount of wire is wasted in routing all branch circuits from one main service box to each branch circuit region that the service box is to power. For example, providing power to the top floor of a large home may require two 15 Amp branch circuits in which case two multi-conductor electrical cables need to be routed from the main service box located in the basement, for example, to the area powered by each circuit. Distributed service panels that may resolve this problem have not been feasible in such situations due to their expense and large size that is not desirable for living space. Although to a lesser extent, electrical wire is also wasted when cable ends must be extended to reach the interior of a new electrical box when adding a load to an existing circuit.

From the home or building owner's standpoint, with the hundreds of electrical connections inside even a small house, the complicated method of cutting and stripping cables and internal wires as described above is likely to result in at least one poor connection that will eventually fail. The possibility of a poor connection is also present for the addition of new outlets. The failure of such a poor connection can be as benign as denying electrical service to all downstream electrical boxes in the circuit or as disastrous as causing a house to burn down. Moreover, nicking, or cutting into, of a conductor of each wire may occur each time insulation is cut off the wire to expose bare copper for the connection. This reduces the wire surface area available for carrying electrical current and can cause localized overheating, with the potential to start a fire. Reduced surface area may also cause a significant voltage drop that slows down motors, dims lights, or affects the operation of voltage sensitive appliances.

Finally, because the multi-conductor electrical cable enters each electrical box and must be folded within the box, space inside each electrical box is limited thereby limiting the number and sophistication of features offered by the electrical units used with the electrical box.

Based on the foregoing, there is a clear need for an electrical box that provides safe and reliable power to a home and/or commercial building.

There is also a need for an electrical box that allows electrical wires to be connected to an exterior surface of the electrical box without occupying space within the electrical box.

There is further a need for an electrical box that allows electrical wires to be connected to the electrical box with minimal cutting and stripping of insulation from the electrical wires.

Finally, there is a need for an electrical box that accepts large electrical units having sophisticated functions and allows easy alignment of electrical units within the electrical box so that a decorative cover can be attached to the electrical box.

SUMMARY OF THE INVENTION

According to one aspect of the invention, an electrical box is provided which includes a hollow container having an open end, an interior surface defining an interior space, and an exterior surface. A neutral connector and a hot connector are mounted on exterior bus bars mounted on the exterior surface of the container and are configured to receive the neutral and hot wire respectively of a multi-conductor electrical cable. A neutral conductive member and a hot conductive member are mounted on interior bus bars mounted to the interior surface of the container and electrically connected to the neutral and hot connector respectively. According to this embodiment, the exterior connectors receive electrical power from a multi-conductor electrical cable and transfer the power to an electrical unit connected to the internal conductive members without the multi-conductor electrical cable entering the interior space of the electrical box. The exterior connectors are preferably insulation displacement connectors (IDCs) and are mounted to exterior bus bars that contain high current screw holes that accept high current wire connectors used where the electrical power is higher than the current capacity of the IDCs.

According to another embodiment of the present invention, the interior bus bars, exterior bus bars, connectors and conductive members comprise a single circuit and the electrical box includes a plurality of single circuits. In this embodiment, the electrical box also includes removable tabs that transfer electrical power from one circuit to another circuit in the plurality of circuits.

According to yet another aspect of the present invention, the conductive members are rigid fingers that protrude from the interior surface of the electrical box such that the electrical unit is plugged into the conductive fingers when the electrical unit is mated with the electrical box. The conductive fingers may be uniquely configured such that only appropriate contacts of the electrical unit can mate with corresponding conductive members.

In another embodiment of the present invention, the interior bus bars, the exterior bus bars, and the removable tabs of the electrical box are configured to carry high current electrical power.

According to still another embodiment of the present invention, removable jumper tabs are provided to route electrical power between two electrical boxes placed adjacent to one another in order to gang the electrical boxes together.

According to another aspect of the present invention, an electrical box is provided which includes a means for containing an electrical unit, the means for containing having an interior surface defining an interior space, and exterior surface, a means for electrically connecting a neutral wire and a hot wire to the exterior surface, and a means for electrically connecting a neutral contact and a hot contact of the electrical unit to the neutral wire and hot wire respectively without the neutral wire and hot wire entering the interior space of the means for containing. The electrical box may also include a means for fastening the electrical box to a finished wall, a means for mating the electrical unit with the electrical box, or a means for fastening an electrical cable to the electrical box. In addition, the electrical box may further include means for covering the means for electrically connecting a neutral wire and a hot wire to the exterior surface of the means for containing, or a means for transferring electrical power from the electrical box to an adjacent electrical box by forming a multi gang electrical box.

According to yet another aspect of the present invention, a method for connecting an electrical load to an electrical circuit in a building is provided. The method includes locating electrical cable of the electrical unit, electrically connecting an electric box to the cable without severing the cable, and electrically connecting the electrical load to the electrical box such that electrical power from the cable is provided to the electrical load. The step of electrically connecting may include stripping a length of outer sheathing from the cable to expose interior wires of the cable, and press fitting at least one of the interior wires of the cable to knife connectors mounted on the electrical box. Moreover, the method further includes clamping the cable to the electrical box such that mechanical stress is relieved from the at least one interior wire connected to the knife connectors, or covering an area where the interior wire is connected to the knife connector.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
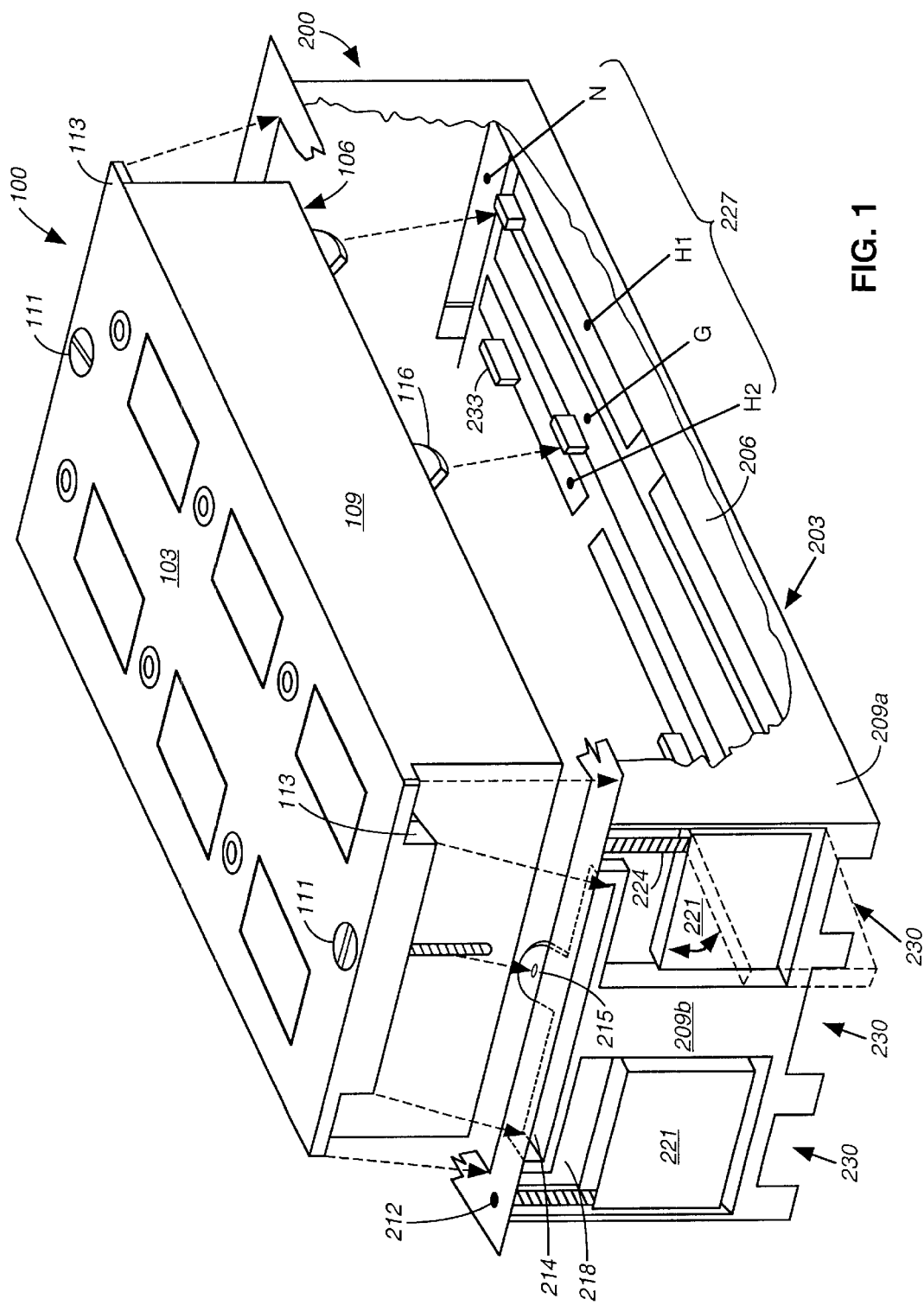
FIG. 1 is a perspective view of an electrical unit mating with an electrical box in accordance with an embodiment of the present invention.

Referring now to the drawings, wherein like reference numerals designate identical or corresponding parts throughout the drawings, an electrical unit and electrical box for providing efficient and reliable wiring of a building, is shown. An embodiment of this invention is shown in FIG. 1, which is a perspective view of an electrical unit 100 mating with an electrical box 200 according to the present invention.

The electrical unit 100 includes a front face 103 and an opposing mating surface 106 joined by a unit sidewall 109. The front face 103 receives two mating screws 111 each of which penetrate a mating edge 113 that protrudes from the unit sidewall 109 in a direction parallel to the front face 103 of the electrical unit 100. Mounted on the mating surface 106 of the electrical unit 100 is a plurality of sockets 116 made of an electrically conductive material. The electrical unit 100 is preferably constructed of a rigid plastic or any suitable electrically insulating material.

The electrical box 200 includes a main body 203 having a conductor carrying surface (i.e., carrier) 206 and box sidewalls 209a and endwalls 209b that protrude at right angles from the conductor carrying surface 206 to define an open ended cavity for receiving electrical unit 100. A seating lip 212 protrudes substantially perpendicularly from the box sidewalls 209a and endwalls 209b around a perimeter of the opening of the electrical box 200 and provides a mating surface for the mating edge 113 of the electrical unit 100. Likewise, tabs (only one shown) including a screw hole 215 are mounted to an interior surface of each endwall 209b in a position of the endwall suitable for receiving the mating screw 111 of the electrical unit 100.

Box endwalls 209b of the electrical box 200 include recessed paddle openings 218 positioned adjacent to fastening paddles 221 rotatably mounted to an interior surface of the box sidewall 209b via a shaft 224. As seen by the phantom paddle in FIG. 1, the fastening paddles 221 may be rotated to protrude from box endwall openings 218 to fasten the electrical box 200 to a finished wall as will be further described. While only one endwall 209b is shown to include the recessed paddle openings 218 and paddles 221, it is to be understood that this fastening structure will is be included on the opposing endwall 209b as well. Moreover, the fastening structure may be provided a sidewall 209a in addition to or in lieu of endwall 209b.

Mounted on an interior surface of the conductor carrier 206 are a plurality of interior bus bars 227. Each bus bar 227 is electrically connected to one of a neutral, hot, ground, or alternative hot electrical wire of a multi-conductor electrical cable carrying building power, by connectors mounted on an exterior surface of the conductor carrier 206 as will be described. The multi-conductor cable is routed to the electrical box 200 by way of cable channels 230 provided on an underside of the electrical box 200. As seen in FIG. 1, the interior neutral bus bars, hot bus bars, ground bus bars, and alternative bus bars are represented by the reference designations N, H1, G, and H2 respectively. Moreover, these reference designations are used to represent the conductivity type of various components of the invention throughout the several drawings. Mounted on each bus bar 227 is a conductive member 233 in electrical contact with the bus bar 227 to which it is mounted. Conductive members 233 are positioned in a suitable configuration to receive the conductive sockets 116 of the electrical unit 100 when the electrical unit 100 is fully mated with the electrical box 200. The dashed arrows of FIG. 1 indicate mating surfaces of the electrical unit 100 and electrical box 200 in FIG. 1.

Figure 2:
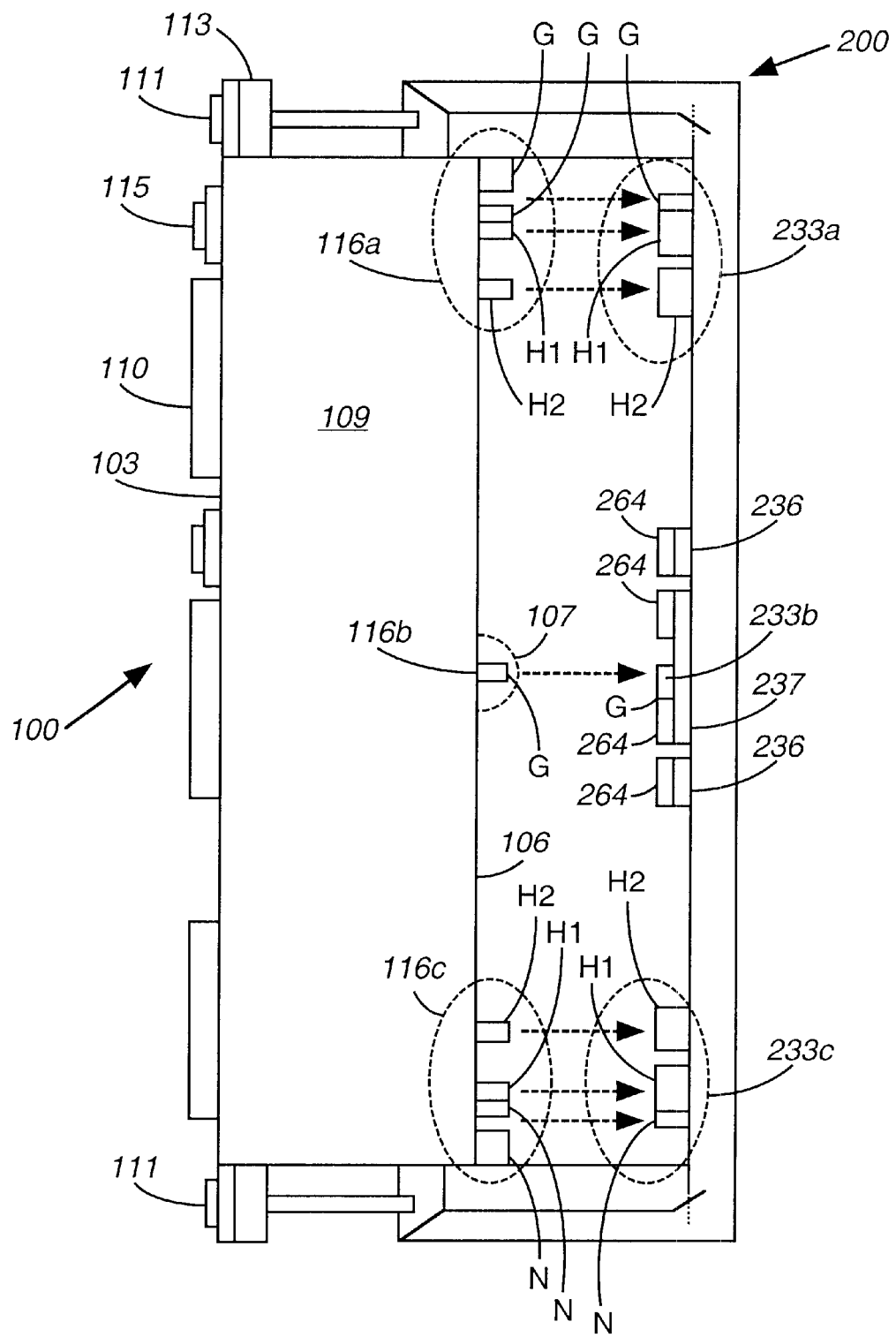
FIG. 2 is a side view of an electrical unit partially mated with an electrical box in accordance with an embodiment of the present invention.

FIG. 2 depicts a side view of an electrical unit 100 mating with an electrical box 200 according to the present invention. A portion of the box sidewall 209 of the electrical box is removed to reveal interior connections between the electrical unit 100 and electrical box 200. Also shown are mating screws 110 penetrating the mating edge 113 of the electrical unit 100 and inserted into the electrical box 200 as discussed with respect to FIG. 1.

The electrical unit 100 shown in FIG. 2 is a circuit breakered six outlet plug module, however, it is to be understood that many types of electrical units may be used in accordance with the present invention as will be described. Mounted on the front face 103 of the electrical unit 100 are electrical outlets 110 and push button circuit breaker switches 115, each of which corresponds to a respective electrical outlet 110. Conductive sockets 116 on the mating surface 106 are grouped in groups 116a, 116b, and 116c to indicate a vertical positioning of the conductive sockets 116. Similarly, the conductive members 233 mounted on the interior bus bars 227 (not shown in FIG. 2) are grouped in groups 233a, 233b, and 233c to show a vertical positioning of the conductive members 233 within the electrical box 200. The conductivity type of each conductive socket 116 and each conductive member 233 is indicated by the reference designations N, H1, G, and H2 as previously discussed.

According to the present invention, building power is present on the conductive members of 233 of the electrical box 200 via connections (not shown in FIG. 2) on the back side of the electrical box and is transferred to the electrical unit 100 by way of the conductive sockets 116 which make electrical contact with the conductive members 233 when the electrical unit 100 is mated with the electrical box 200. Accordingly, as shown in FIG. 2, the conductive sockets 116 are configured on the mating surface 106 such that each of the conductive sockets 116 mates with a same conductivity type conductive member 233 each of which is also suitably configured on the interior surface of the conductor carrier 206. The dashed arrows of FIG. 2 indicate the approximate mating contact of the conductive sockets 116 with the conductive members 233 when the electrical unit 100 is mated with the electrical box 200.

The electrical unit 100 may include a non-conductive block 107 shown in phantom as a safety feature which prevents a non-compatible electrical unit from mating with a particular electrical box 200. For example, if electrical box 200 is configured to be a high current box, as will be described below, then electrical units 100 not rated for high current preferably would include non-conductive blocks 107 positioned such that they obstruct the mating of the electrical unit 100 with the electrical box 200. It is to be understood that the non-conductive blocks 107 are exemplary only in FIG. 2 as the electrical unit 100 of FIG. 2 is compatible with a high current box due to the circuit breaker switches 115. An end view of conductive horizontal tabs 236 and a side view of conductive vertical tab 237 are also shown in FIG. 2. The conductive tabs 236 and 237 are removably fastened to the bus bars 227 of the conductor carrier 206 by #4 or #6 flat head screws 264 as will be discussed.

Figure 3A:
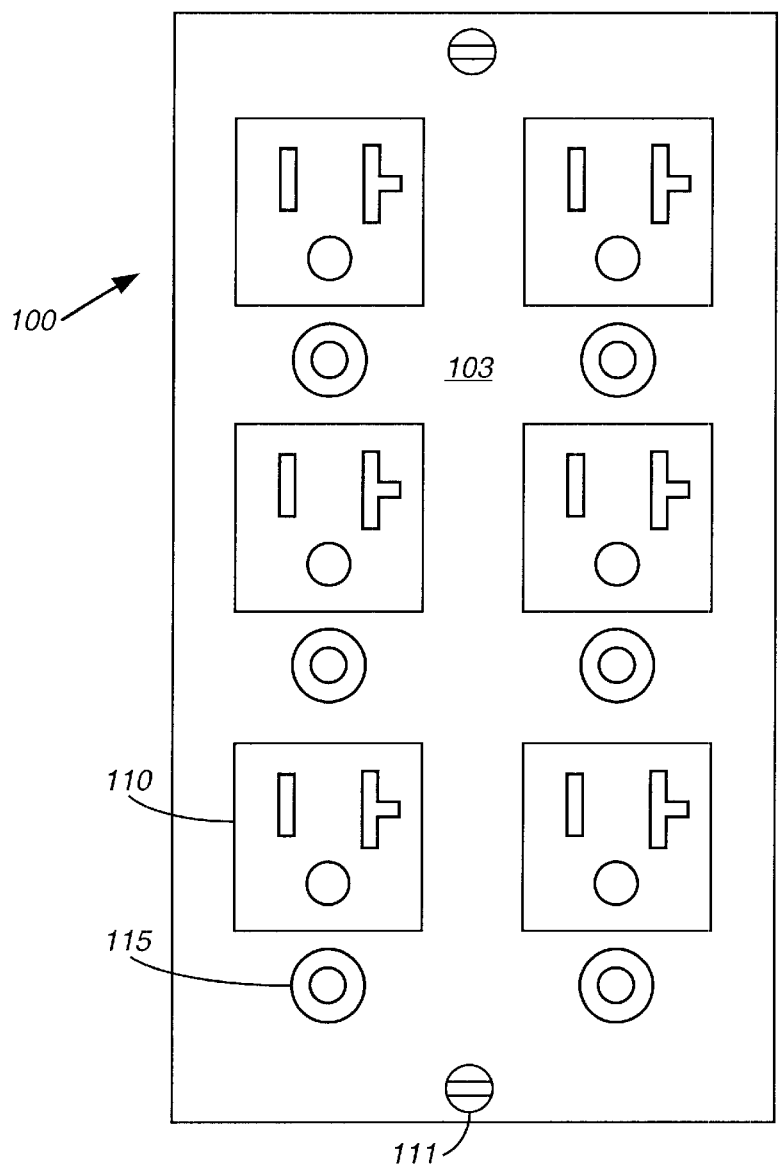
FIGS. 3A and 3B are a front face view and an end view respectively of an electrical unit in accordance with an embodiment of the present invention.
Figure 3B:
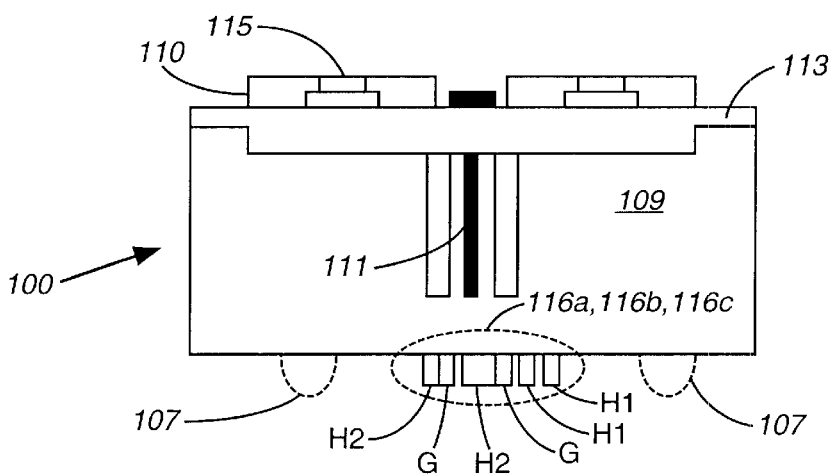

FIGS. 3A and 3B depict a front face view and a bottom end view respectively of the electrical unit 100 of FIG. 2. As seen in FIG. 3A, the six electrical outlets 110 are positioned vertically in 3 horizontal pairs on the front face 103 of the electrical unit 100. Each of the electrical outlets 110 is a standard 110VAC 20 amp outlet used in household wiring and each outlet has a corresponding push button breaker switch 115. Each push button breaker switch 115 is designed to pass electrical power to its corresponding electrical outlet when the switch is in a depressed position, and to block power when in an out or tripped position. FIG. 3B shows the horizontal positioning of the conductive sockets 116 on the electrical unit 100. The conductive sockets 116 shown in FIG. 3B are conductive sockets included in groups 116a, 116b, and 116c of FIG. 2; however, conductive sockets that would obstruct the non-conductive blocks 107 (or bumps) have been removed so that positioning of the non-conductive bumps 107 can be clearly seen.

Figure 4:
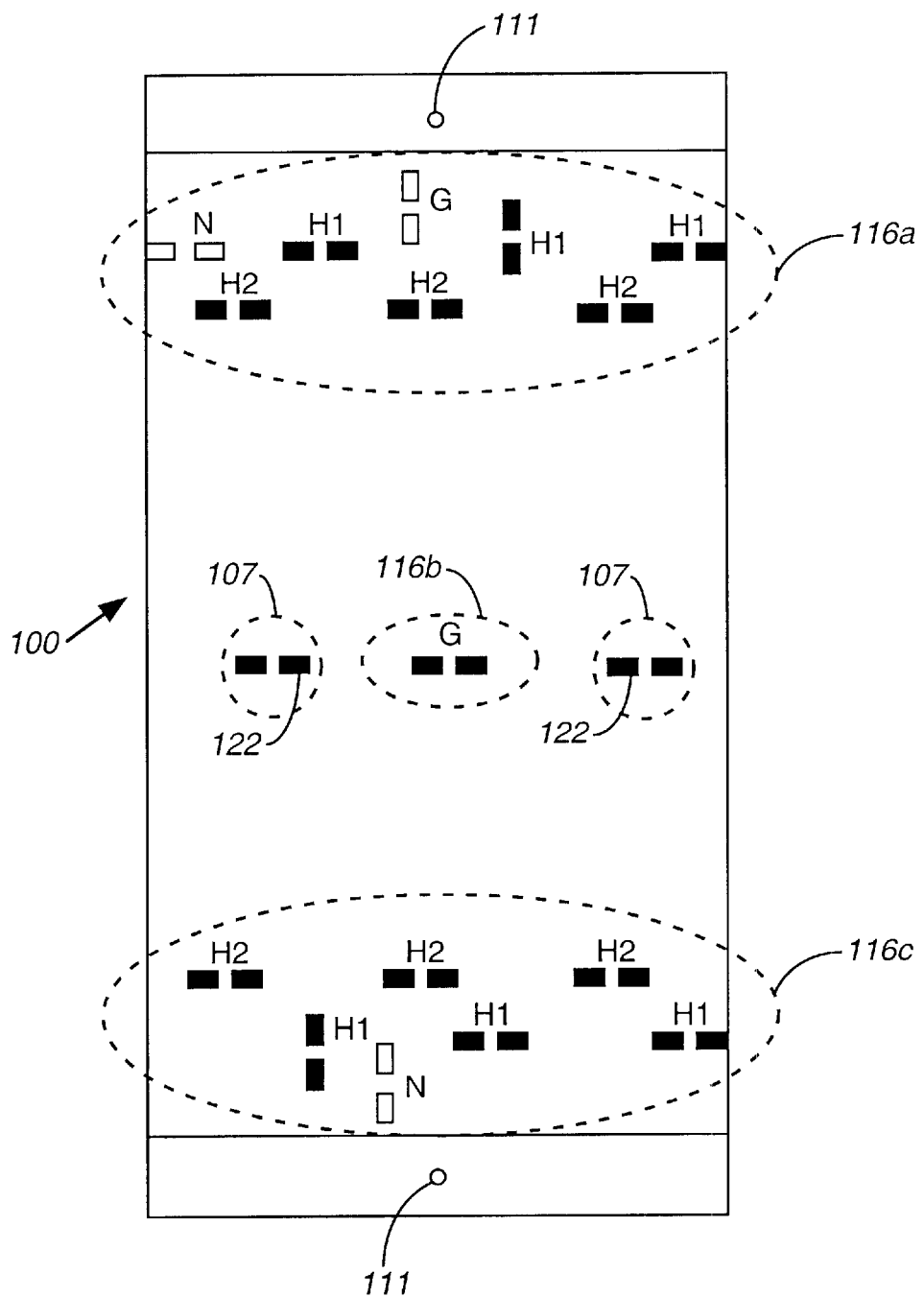
FIG. 4 is a bottom view of an electrical unit in accordance with an embodiment of the present invention.

FIG. 4 is a bottom view of electrical unit 100 showing the positioning of conductive sockets 116 on the mating surface 106 of the electrical unit. Conductive sockets 116a, 116b, and 116c correspond to the conductive sockets having the same reference designations in FIG. 2. The non-conductive blocks 107 are positioned on each side of the ground socket 116b. As described above, these non-conductive blocks 107 provide a safety feature that prevents a non-high current unit from mating with a high current electrical box. The non-conductive blocks 107 may be replaced with conductive ground sockets on high current electrical units as shown by the phantom sockets 122 in FIG. 4. The threaded ends of mating screws 111 are also shown in this figure.

Figures 5A, 5B:
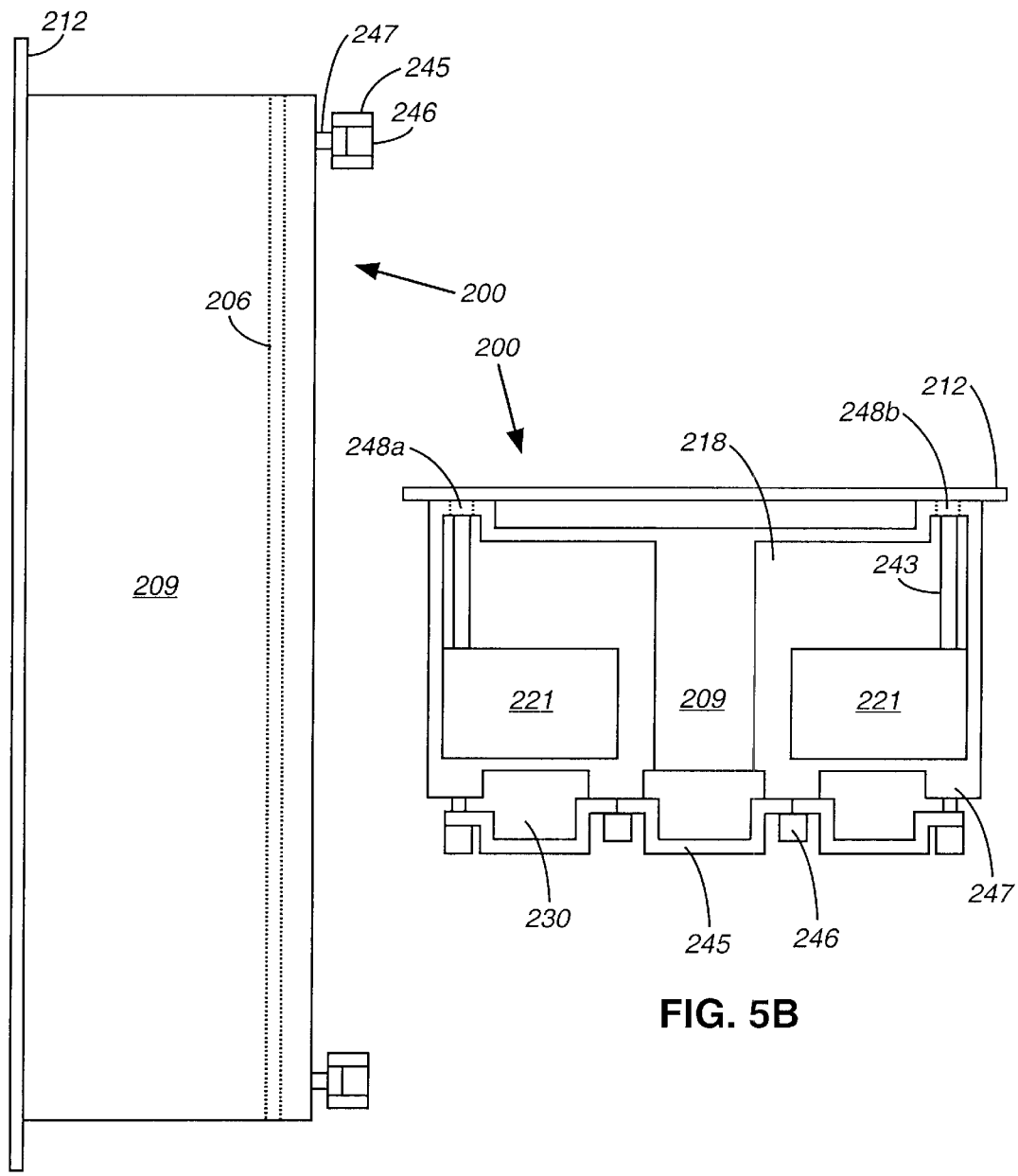
FIGS. 5A and 5B are a side view and an end view respectively of an electrical box in accordance with an embodiment of the present invention.

FIGS. 5A and 5B show a side view and an end view of the electrical respectively. As seen in these figures, conductor carrier 206 is inset from the back surface of the cavity defined by the box sidewalls 209a of the electrical box 200. As best seen in FIG. 5B, the conductor carrier 206 is inset at least enough so that it does not obstruct the cable channels 230. It is to be understood, however, that the inset depth of the conductor carrier 206 and the cable channels 230 may be varied depending on the application of the present invention. For example, in high current applications, the electrical cable used may include wires of a large gauge in which case the cable channels 230 and the conductor carrier 206 are of suitable dimensions for the larger cable. Likewise, it is to be understood that the depth of the cavity of the electrical box 200 may be of any size suitable to receive an electrical unit. The depth of the cavity is preferably slightly less than the width of the framing lumber used to form the wall that the electrical box is to be inserted into so that maximum space is provided for the electrical unit 100.

Cable clamps 245 are provided for clamping electrical cables that enter and exit the electrical box 200. The cable clamps 245 are removably mounted opposing the cable channels 230 by way of cable clamp screws 246. Spacers 247 allow a back cover plate to be installed over the back side of the electrical box 200 as will be described.

As shown in phantom in FIG. 5B, fastening screws 248 are connected to each shaft 243 for rotating paddles 221 into and out of a fixing position as described with respect to FIG. 1. One fastening screw 248a will turn clockwise to extend the paddle 221 out, then up so the paddle 221 and the seating lip 212 will clamp onto the wall the electrical box 200 is being inserted into. The same screw 248a will turn counter clockwise to release the paddle 221 and swing it back into the recessed area (i.e., opening) 218 so the electrical box 200 can be removed from the wall. The other screw 248b on the same end will turn counter clockwise to extend it's paddle 221 out and pinch the wall against it and seating lip 212, and turn clockwise to release the wall and swing the paddle 221 back into the recessed area 218. Both screws 248a and 248b are shown, however, for single gang electrical box 200 only one screw with it's associated paddle 221 may be used. In multi-gang boxes 300 (as will be discussed in FIG. 12) one paddle 221 and screw 248 may be adjacent to each corner between endwall 209b and sidewall 209a.

Figure 6:
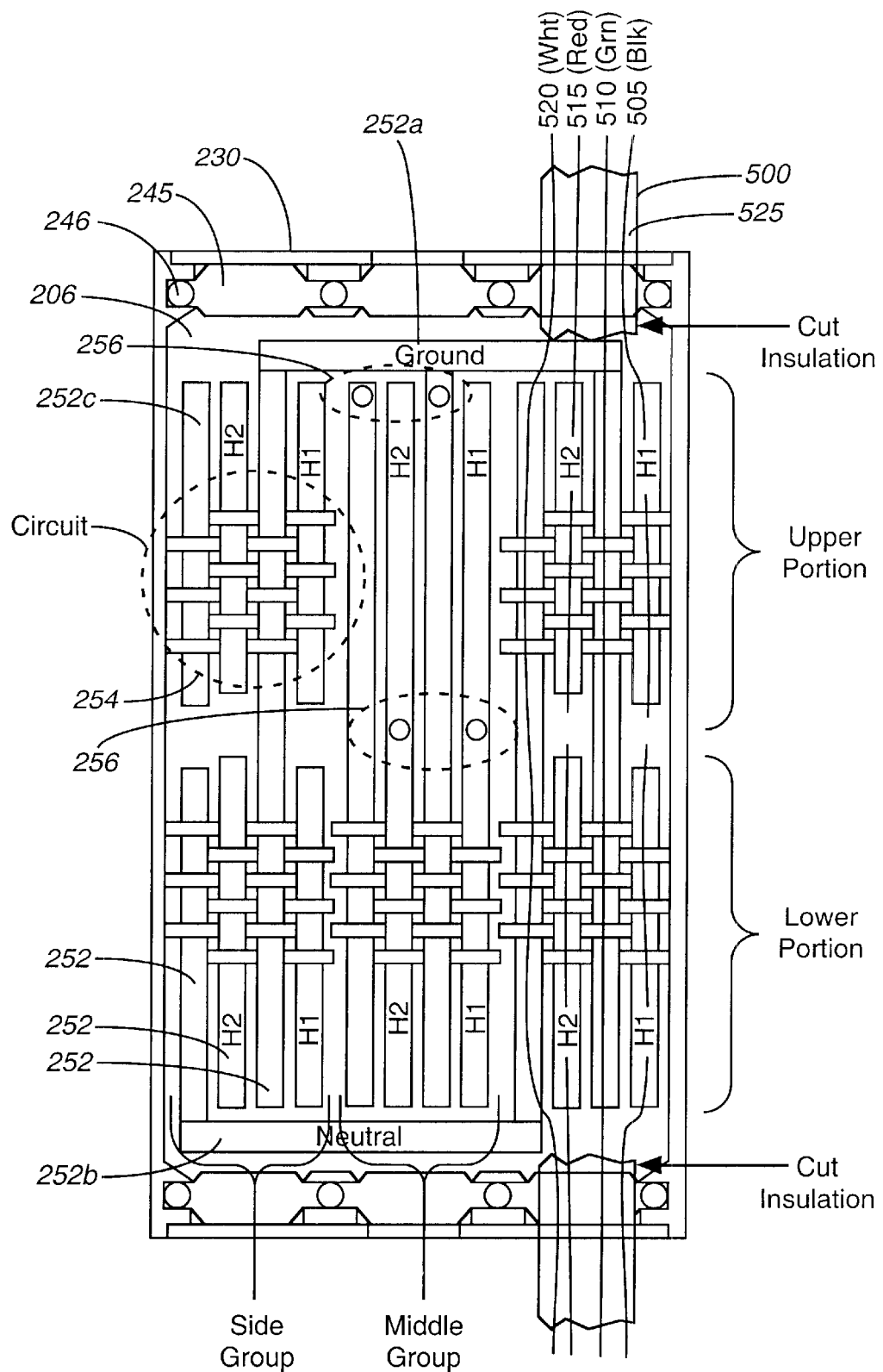
FIG. 6 is a back view of an electrical box in accordance with an embodiment of the present invention.

FIG. 6 is a back view of the electrical box 200 having a multi-conductor cable 500 attached thereto. The multi-conductor cable 500 includes insulated wires 505, 510, 515, and 520 within an outer insulation sheathing 525 shown as transparent in FIG. 6. Wires 505, 510, 515, and 520 are labeled as black, green, red, and white respectively according to the typical color scheme of multi-conductor electrical cables used in the USA. A back view of cable clamps 245 (also transparent where necessary) and cable clamp screws 246 is also shown. Although the electrical box 200 of FIG. 6 shows three sets of cable clamps 245, it is to be understood that any number of cable clamps 245 may be provided in order to allow a number of cables sufficient to provide power to the electrical box 200 to pass through the electrical box.

Mounted on conductor carrier 206 are a plurality of conductive exterior bus bars 252 each of which corresponds to one of hot, neutral, ground, and alternative hot conductivity as indicated by the "H1", "N", "G", and "H2" referenced. The external bus bars 252 are grouped into a continuous middle group, and two side groups, each of which is separated into lower and upper portions. Only one side group is labeled in FIG. 6 to avoid obscuring the multi-conductor cable 500. The lower and upper portions of each side group have electrically independent hot and alternative hot external bus bars 252. A horizontal ground bus bar 252a electrically connects all of the vertically oriented ground bus bars within the electrical box 200. Similarly, a neutral joining bus bar 252b electrically connects all neutral bus bars in the electrical box with the exception of one neutral bus bar 252c that is isolated from other neutral bus bars of the electrical box and is used for ground fault circuit interruption applications as will be discussed.

A plurality of insulation displacement connectors (IDCs) 254 are positioned on each external bus bar 252. The IDCs 254 are preferably knife blade type connectors that provide a gas tight electrical connection with insulated wires 505, 510, 515, and 520 which are press fitted into the IDC connectors 254. The IDC connectors 254 are preferably configured to accept wires having a wire gauge from 14 to 10, and each IDC 254 is preferably capable of carrying 15 A. As seen in FIG. 6, the IDCs 254 are provided in sets of three to provide redundancy in the event that one of the knife blades does not make a proper connection with a wire. This allows a single IDC 254 in any group of three to fail while the other two IDCs in the group can still carry 30 A between them. Sets of IDCs 254 on an exterior bus bar 252 of a particular conductivity type are staggered with respect to IDCs 254 of an adjacent exterior bus bar 252 of a different conductivity type in order to minimize the possibility of shorting between exterior bus bars. As also seen in FIG. 6, these staggered sets of IDCs 254 provide a single circuit suitable for wiring a branch circuit off of the electrical box 200 as will be described.

High current screw holes 256 on each of the exterior bus bars 252 of the middle group, are configured to receive a clamp type wire connector (not shown). The clamp type wire connectors clamp down on a bare conductor of wires 505, 510, 515, and 520 to provide electrical contact when a screw of the connector is fastened to the screw hole 256. These connectors are used in high current applications where IDC connectors 254 have insufficient current capacity. The high current screw holes 256 are preferably rated to carry 60 A of current and are used to hold wire clamps that can be connected to 8, 6 or 4 gauge wire which carry 40 A, 55–60 A, and 70 A capacity respectively. All bus bars 252 in the middle group of FIG. 6 preferably carry 40 A while all other bus bars in the each of the side groups are preferably rated to carry 30 A. Current from the screw holes 256, can flow in multiple directions on each bus bar 252 so that the bus bars do not have to carry as much current as the high current screw holes 256.

Figure 7:
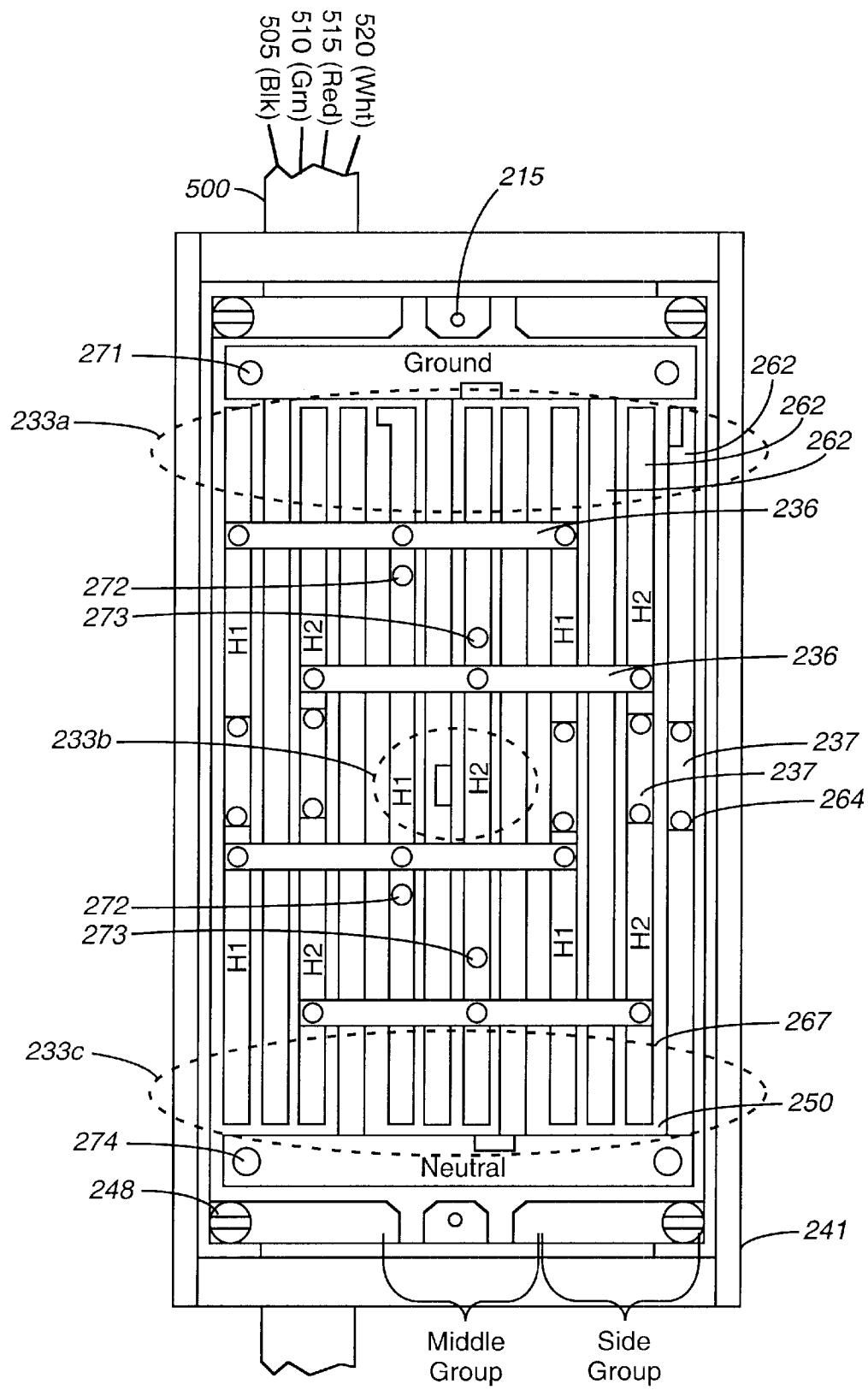
FIG. 7 is a front view of an electrical box in accordance with an embodiment of the present invention.

FIG. 7 is a front view of the electrical box 200 of FIG. 6 connected to multi-conductor cable 500. A plurality of interior bus bars 227 each of which corresponds to a hot, neutral, ground, and alternative hot are mounted on an interior surface of conductor carrier 206. It is noted that the neutral (N), alternative hot (H2), and ground (G) interior bus bars indicated by the referenced designator 227 of FIG. 7 correspond to the neutral, alternative hot, and ground exterior bus bars indicated by the reference designation 252 of FIG. 6. Moreover, the middle and side groups of interior bus bars 227 of FIG. 7 correspond to the middle and side groups of exterior bus bars 252 shown in FIG. 6. While the exterior bus bars 252 of FIG. 6 and the interior bus bars 262 of FIG. 7 are shown as occupying the same area on opposing sides of the conductor board 250, it is to be understood that it is not necessary for these bus bars to occupy the same area as long as electrical connection is made between corresponding internal and external bus bars. Moreover, it is to be understood that the internal bus bars 262 and external bus bars 252 may be mounted on separate substrates rather than a single conductor carrier 206. Thus, corresponding elements of FIGS. 6 and 7, such as cable 500, are positioned on opposite sides of each figure due to rotation of the electrical box 200 to obtain the back and front views of FIGS. 6 and 7 respectively. A front view of paddle screws 248 are also shown in FIG. 7 along with screw holes 215 positioned in the tabs discussed with respect to FIG. 1. Also shown in shade is seating lip 212 positioned along the perimeter of an opening to the electrical box 200.

Removable conductive tabs 236 and 237 are mounted between interior bus bars 262 by use of #4 or #6 flat head screws depicted by the circles 264. Each conductive tab 262 is preferably rated for 30 A. Horizontal tabs 236 are used to distribute power from the hot and alternate hot interior bus bars 262 of the middle group to hot and alternative hot interior bus bars 262 in each side group respectively. Removable tabs 237 are positioned vertically to electrically connect the upper portion of each side group of interior bus bars 262 to a lower portion within the same side group when needed. Safety ground has no vertical tab bar because ground is common through an entire electrical box. Neutral has one vertical removable tab 237*a*, on one of the side groups which is used with a ground fault circuit interrupter (GFCI). Tab 237*a* allows the neutral of a GFCI outlet to be isolated so that in the event of a ground fault it can disconnected from the balance of the neutral.

A plurality of conductive members 233 protrude from the conductor carrier 206 of the electrical box 200 to allow mating with the electrical unit 100 as described with respect to FIG. 1. End views of the conductive members 233 are shown as small rectangular boxes within respective interior bus bars 262 that are grouped into groups 233*a*, 233*b*, and 233*c*. Each of these groups corresponds to the conductive members having the same reference designation in FIG. 2. The conductive members 233 are oriented in a horizontal and vertical direction in order to allow mating of similarly oriented conductive sockets 116 on the electrical unit 100 which have the same conductivity type. The conductive members 233 preferably carry up to 60 A for the electrical unit. Multi gang screw holes 271, 272, 273, and 274 are positioned in the ground, hot, alternative hot, and neutral interior bus bars 262 respectively to allow for mounting gang to gang removable tabs as will be further discussed below.

Figure 8:
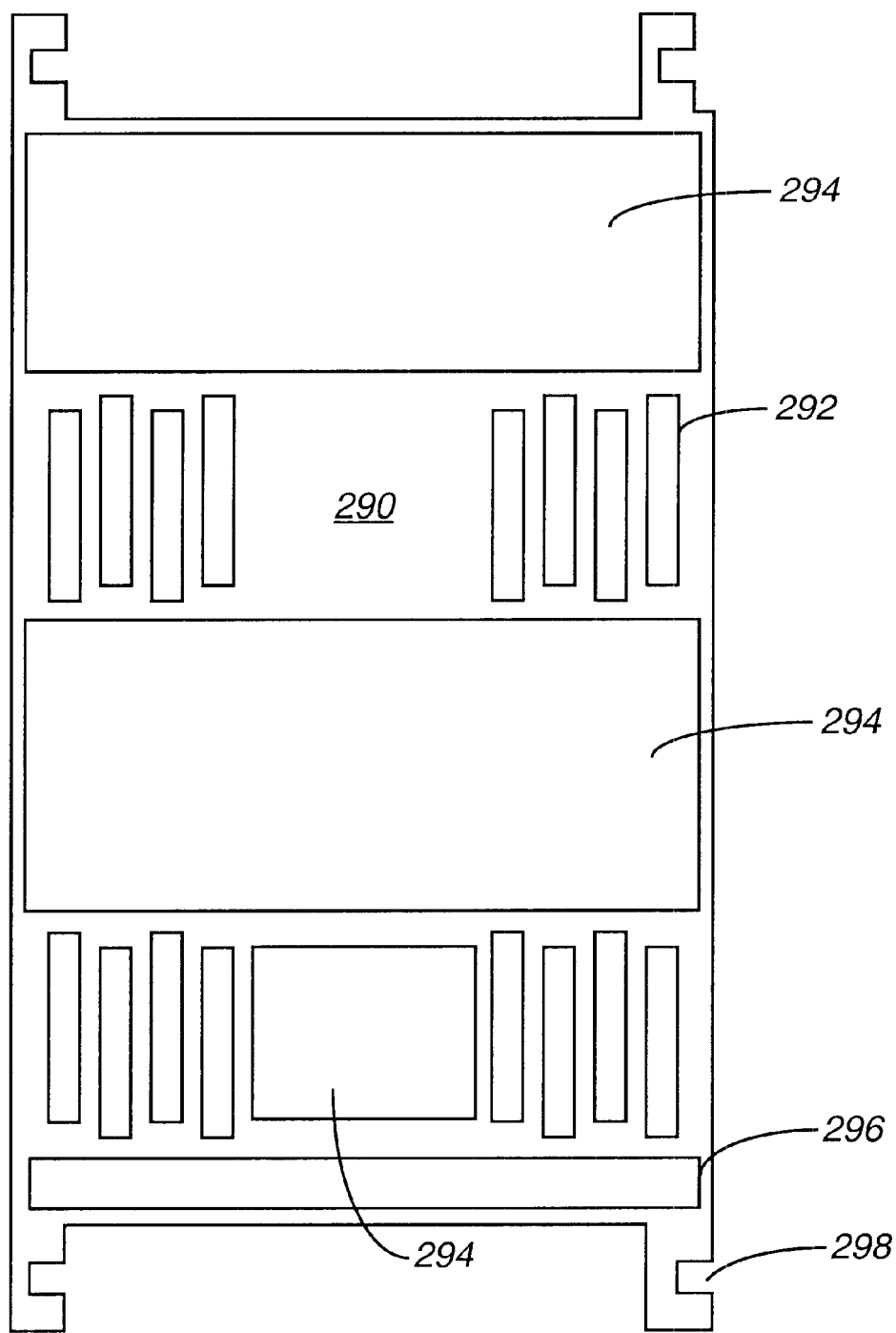
FIG. 8 is an interior view of an electrical box cover plate in accordance with an embodiment of the present invention.

FIG. 8 shows a cover plate used to cover the IDCs 254, connected wires, and other components of the back side of the electrical box 200. Sets of push bars 292 are preferably mounted within the cover plate 290 to hold down smaller gauge wires onto the knife blades of IDCs 254. These push bars 292 are placed in different positions depending on the configuration of the electrical box 200 and may be removed if all of the wires entering the electrical box 200 are larger than 10 gauge thereby requiring high current wire clamps to be used as previously discussed. Cavities 294 provide recessed areas for large gauge wires and wire clamps, and further provide stiffening for the push bars 292. A stiffener 296 may be added in areas of the cover plate 290 not having a cavity 294. The cover plate 290 also includes a notched tab 298 that mates with the spacers 247 (shown in FIG. 4B) to hold the cover plate 290 onto the electrical box 200. Preferably the cover plate 290 can work with both the standard electrical box 200 and high current electrical box 200' (FIG. 9), although if this is not possible separate cover plates can be provided.

Figure 9:
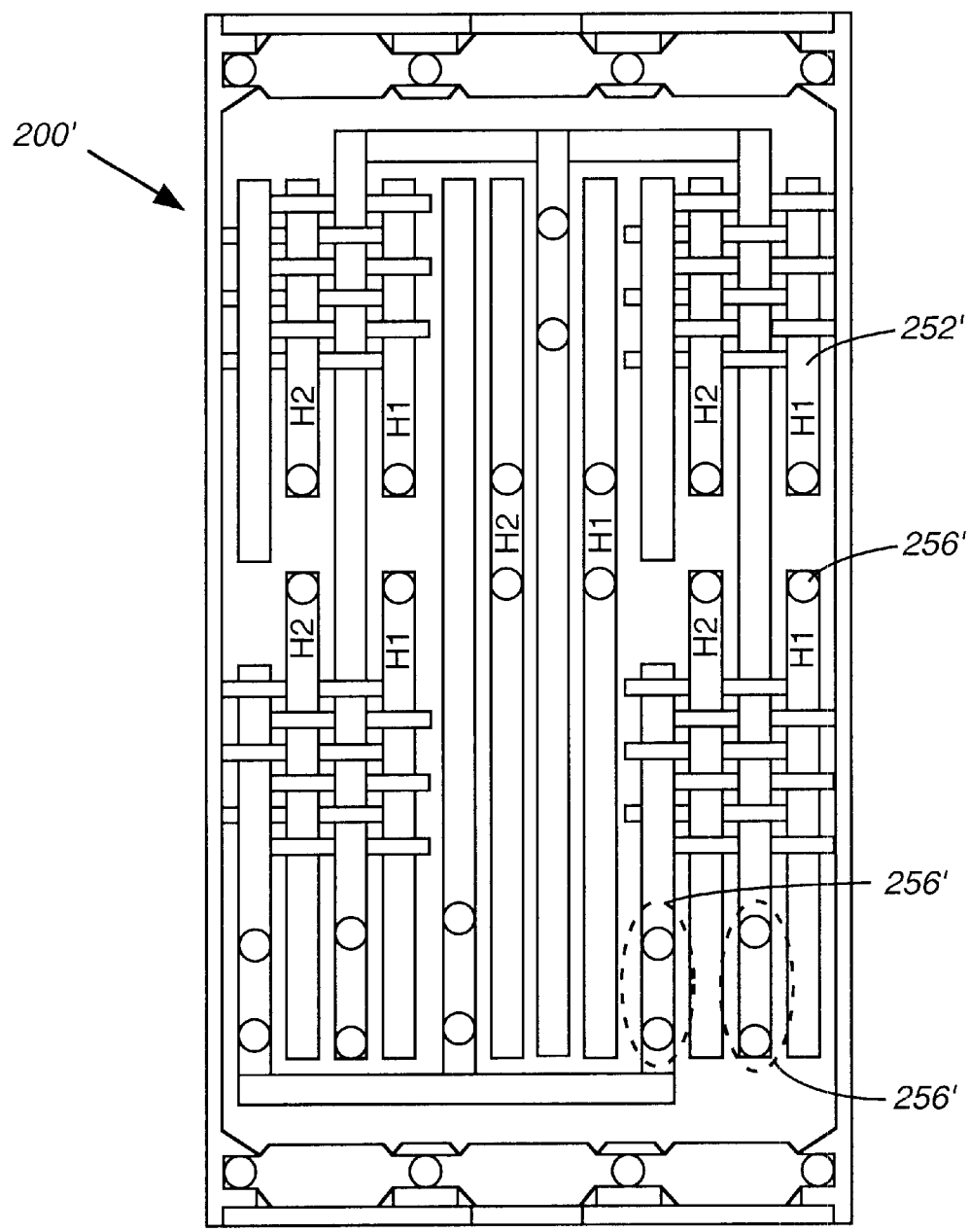
FIG. 9 is a back view of a high current electrical box in accordance with an embodiment of the present invention.

FIG. 9 is a back view of a high current electrical box according to an embodiment of the present invention. The high current electrical box 200' is similar to the electrical box 200 previously described but can carry up to 60 A per bus bar. Description of components of the high current electrical box 200' that are similar to the corresponding components of the electrical box 200 are omitted in order to avoid obscuring the differences between these two embodiments. As seen in FIG. 9, a pair of screw holes 256' are provided for each ground and neutral bus bar 252' as well as the hot and alternative hot bus bars of the middle group. Upper and lower hot and alternative hot bus bars 252' of each side group have only one screw hole 256'. As with the high current screw holes 256 of the electrical box 200, the screw holes 256' are provided for mounting wire clamps to the exterior bus bars 252'. All bus bars 252' and screw holes 256' preferably carry up to 60 A, or 6 gauge wires. By paralleling two screw holes 256', up to 100 A can pass through the high current electrical box 200' using 2 gauge wires. This also connects together the lower and upper hot and alternate hot bus bars. The high current electrical box 220' can accommodate four 220VAC circuit breaker/switches of up to 60 A, or eight 110VAC circuit breaker/switches of up to 30 A.

Figure 10:
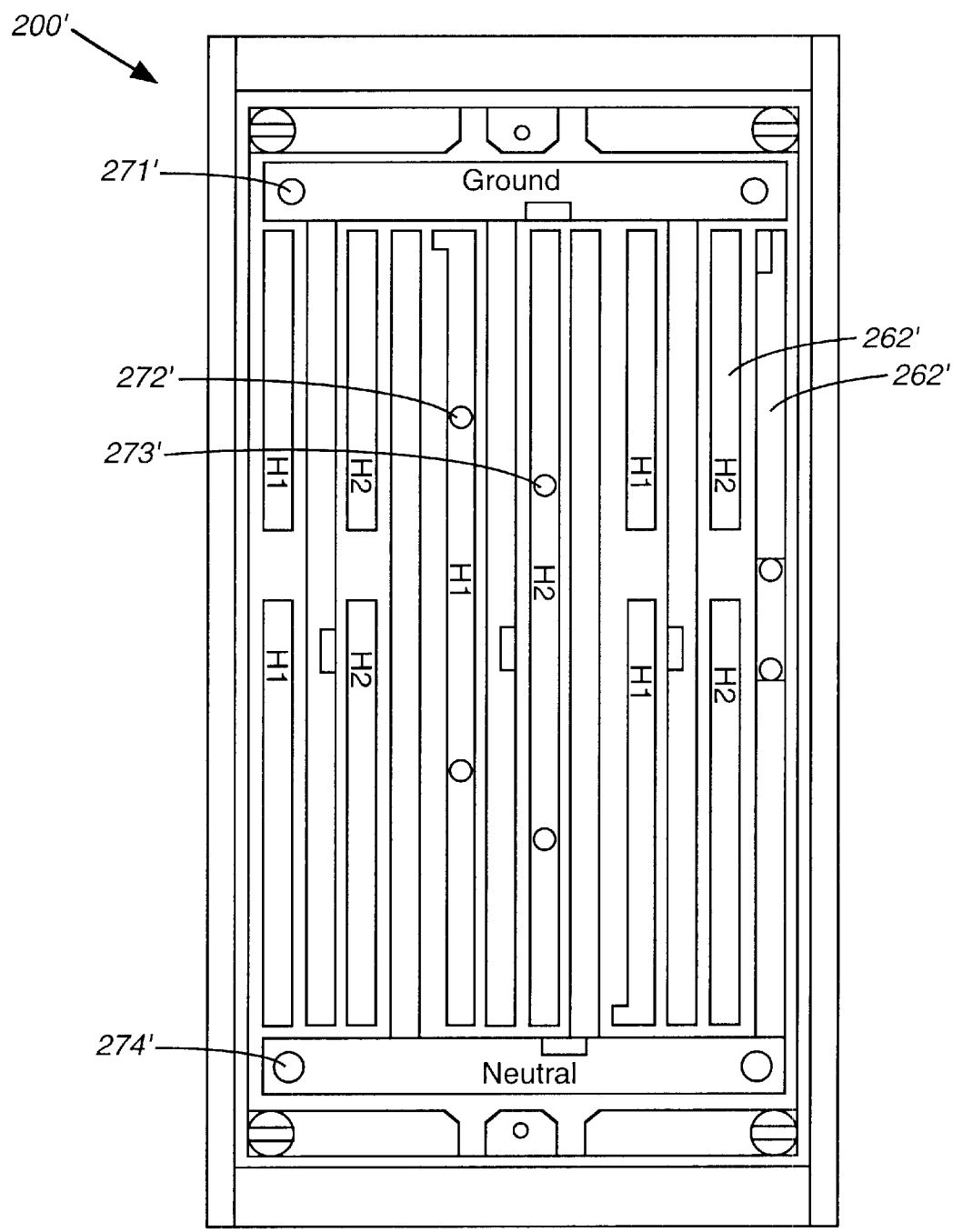
FIG. 10 is a front view of a high current electrical box in accordance with an embodiment of the present invention.

FIG. 10 is a front view of the high current electrical box 200' according to the present invention. In the high current box 200', the neutral and safety grounds are enclosed on opposite ends on the front side versus the back side. This allows 60 A rated bus bars to carry 100 A by having half the current flow in one direction while the other half flows in the other direction. As with the electrical box 200, multi-gang screw holes 271', 272', 273', and 274' are positioned in the ground, hot, alternative hot, and neutral interior bus bars 262' respectively to allow for mounting gang to gang removable tabs as will be described below. Each removable tab of the high current electrical box 200' carries 60 A. One cross bus bar is needed for carrying currents up to 60 A, while both cross bus bars are needed to carry currents above that. The high current electrical box 200' does not include any horizontal conductive tabs and includes only one vertical removable tab 237*a* on the neutral bus bar 262' for use in GFCI applications as discussed above.

Each conductive member 233' of the high current electrical box 200', like the electrical box 200, will carry up to 60A. The conductive members 233' are positioned at locations identical to those of the non-high current version, except that extra ground tabs 122 are added as discussed with respect to FIG. 4. As also discussed, any electrical unit (switch, plug, circuit breaker, etc) not intended for use in a high current electrical box 200' only will have a nonconductive block 107 that prevents the electrical unit being pushed into a high current electrical box 200' because the extra conductive members 122 occupy the space the nonconductive blocks 107 take up in a mating position.

A functional description of the electrical unit 100 and the electrical box 200 will now be given by reference to the exemplary situation in which an additional load, such as a 110 VAC electrical outlet, is added to an existing electrical circuit in a home or building. While the below description assumes that an electrician installs the new load, the present invention makes such an installation simple enough for a homeowner or other non-electrician to accomplish.

In the above-described example, the electrician first determines the location of electrical cable of an existing circuit behind a finished wall based on electrical plans or the position of existing outlets and local electrical codes if plans are not available. A wall opening is then cut in the finished wall in a desired area in close proximity to the existing cable. The wall opening is preferably cut using a template to ensure that the opening is slightly larger than the main body 203 of the electrical box 200, yet smaller than the seating lip 212. Once the wall opening is cut, insulation, vapor barrier and other debris is removed from the opening to expose the electrical cable. The exposed cable is then pulled through the wall opening as much as possible in preparation for connection to the electrical box 200.

The exposed power cable is sized against the back side of the electrical box 200 and markings are placed on the cable to designate a length of the cable that will be stripped of outer insulation sheathing. As seen in FIG. 6, the amount of insulation sheathing 525 removed is preferably of sufficient length to expose the internal wires 505, 510, 515, and 520 of the cable 500 to the IDCs 254, but short enough so that the outer sheathing of the cable 500 can be clamped within the cable clamps 245. The position at which the outer insulation sheathing 525 is stripped off the cable is indicated by the arrows in FIG. 6. As is known to one of ordinary skill in the art of electrical wiring, the insulated wires of the cable 500 are typically color coded whereby a hot wire 505 which is black, a ground wire 510 is green or a bare conductor, an alternative hot wire 515 is red, and a neutral return wire 520 is white as indicated in FIG. 6. It is to be understood that not all wires are necessary to realizing the advantages of the present application. For example, it is well known that the majority of wiring circumstances require only one hot wire in which case the cable 500 does not include the red alternative hot wire 515.

Once an optimum length of insulation is stripped from the cable 500, the cable is placed in an appropriate cable channel 230 and the cable clamp screws 246 are tightened down until the cable 500 is clamped snuggly between the cable channel 230 and the cable clamp 245. This relieves mechanical stress from electrical connections between the electrical box 200 and the wires of the cable 500 as required by the National Electric Code (NEC). Electrical connections are made by press fitting or punching down the wires 505, 510, 515, and 520 onto appropriate IDCs 254 in accordance with the color codes of the wires. In a preferred embodiment, the IDCs 254 and/or exterior bus bars 252 are color coded in coordination with the wires. Although FIG. 6 shows electrical cable 500 connected to the IDCs 254 of a side group, in adding an electrical outlet to an existing circuit, it is preferable to attach the power cable 500 to the middle group of exterior bus bars 252 as power needs to pass through the electrical box to feed downstream outlets of the existing circuit. A situation in which a cable is connected to a side group as shown in FIG. 6 will be discussed below with respect to new construction wiring.

With the insulated wires connected to the middle group of electrical box 200, back cover plate 290 is attached to the electrical box 200 to provide complete coverage of the cable clamps 245, exposed wires 505, 510, 515, and 520, and IDC connections as required by NEC. In attaching the cover plate 290, the cover plate is slid laterally into contact with the electrical box 200 such that notches 298 of the cover plate are fit snuggly around spacers 247.

With the cover plate 290 installed, the electrical box 200 is inserted into the wall opening cut to a suitable size as discussed. To insert the main body 203 of the electrical box 200 into the wall opening, fastening paddles 221 must be in a retracted position as shown by the solid lines in FIG. 1. The main body 203 is placed within the opening and the electrical box 200 is pushed into the hollow wall until the seating lip 212 is flush against the finished wall. While holding the seating lip 212 in a flush position, the paddle screws 248 are operated to rotate the fastening paddles 221 from a retracted position to a fastening position wherein the paddles protrude from the box sidewall openings 218 as shown by the phantom paddle in FIG. 1. With the paddles in a protruding position, the fastening paddles 221 abut against the interior side of the finished wall to securely fix the finished wall between the fastening paddle 221 and seating lip 212 to thereby hold the electrical box 200 in place. The distance between the protruding fastening paddle 221 and the opposing seating lip 212 is preferably ½ inch for use with ½ inch sheet rock finished wall; however, it is to be understood that this distance may be varied to accommodate a different finished wall thickness.

With the electrical box 200 fastened to the wall, the electrical unit 100 is pressed fitted into the electrical box 200 to complete the installation of a load to an existing circuit. Because the electrical box is connected to the finished wall as discussed above, and not to framing lumber, it is preferred that the mating force not be applied to the wall itself. Therefore, the electrician fastens the mating screws 111 of the electrical unit 100 with the screw holes 215 of the electrical box 200. The screws are then rotated in an alternating manner such that the electrical unit 100 is pulled into a mating position with the electrical box 200. Mating screws 111 may also be used to disconnect the electrical unit 100 from the electrical box 200. Alternately the electrical unit 100 may be mated with the electrical box 200 before the box is inserted into the wall cavity.

As best seen in FIG. 1, when the electrical box 200 is mated with the electrical unit 100, the mating edges of the electrical unit about the seating lip 212 and mating surface 214 of the electrical box 200. Electrical contact is also made between the conductive members 233 and the conductive sockets 116. A finished cover may be placed over the electrical unit 100 and seating lip 241 on the exterior of the finished wall to improve the aesthetics of the electrical unit 100 and box 200.

Thus, in adding a load to an existing circuit in a building, the electrical wires of the existing cable are quickly connected to the electrical box by punching the wires down onto the IDCs without cutting or stripping the wires. Moreover, the redundant IDCs provide a reliable gas tight electrical connection without the possibility of nicking that exists when stripping wires. Moreover, because the existing wires are not cut, it is unnecessary to provide a special junction box to provide wire extensions for the existing wires. Finally, by using the conductive member and conductive finger mating system, no wires enter the interior of the electrical box leaving more room for larger electrical units having more functions.

Improvements in new construction electrical wiring may also be realized by use of the electrical unit 100 and electrical box 200 according to the present invention. In such new construction wiring, a primary run of electrical cable is first routed from the service panel to a number of regions in the building. The electrical cable is preferably a four conductor cable rated to carry 220 VAC, 30 or higher amp, power from the service box to the different regions of the building and is routed in a continuous run without cutting the cable into segments. In routing the electrical cable through the different regions of the building, slack is preferably provided so that the cable may be pulled through a finished wall when an electrical box is attached to the electrical cable. Moreover, two or more primary 220 VAC lines may be needed for a particular building depending on the service requirement of the building and the amperage rating of the primary cable.

Once the 220 VAC 30 amp lines are routed, branch circuits are routed for each region according to a wiring plan. Each branch circuit is typically a three conductor 110VAC line that is tapped into the hot or alternative hot power of the primary 220 VAC line. As with the primary 220 VAC line, each branch circuit line is a continuous line that begins at the area where it taps into the 220 VAC line and ends at the most remote outlet location in the branch. The branch lines are not spliced into the 220VAC line, but rather are tied or taped to the 220 VAC line to maintain their position during subsequent phases of constructing the building.

The finished wall is then installed to cover the electrical wiring and any insulation installed in the wall. As there are no electrical boxes yet installed, installing the finished wall can be done more efficiently since the wall does not have to be cut around existing outlets as with prior art wiring processes. However, it is preferred that areas where the branch lines are taped or tied to the primary line be marked on the finished wall as the wall is installed.

After the wall is installed, a wall opening is cut at the marked area of the wall where the branch circuits meet the primary line and the primary line and branch lines are untied and pulled through the opening. The outer insulation is first stripped off of the primary 220VAC line which is then connected to the middle group of exterior bus bars 252 as discussed above with respect to installing a new outlet to an existing line. The ends of the branch lines are then attached to the IDCs 254 on the upper and lower portions of the side groups of the electrical box 200. As shown in FIG. 6, a continuous branch cable line may be used to route two branch circuits off of a single side group of bus bars. In this case, the hot and/or alternative hot wires are cut to isolate the upper and lower circuits as also shown in FIG. 6. Four branch circuits carrying 220VAC or preferably 110VAC may be routed from the junction box using the four sets of IDCs 254 in the upper and lower portions of each side group of the electrical box 200.

Once the primary and branch lines are connected to the IDCs 254, the back cover 290 is installed to the electrical box 200 and the electrical box is fastened to the finished wall as previously discussed. With the electronic box fixed in the wall, the electrician then installs horizontal conductive tabs 236 to the interior of the electrical box according to the number and positioning of branch circuits attached to the IDCs 254. Specifically, where the upper portion of one side group is wired to a branch circuit, a horizontal tab 236 is connected between a hot bus bar of the middle group and a corresponding hot bus bar in the upper portion of the side group to which a circuit is wired by fastening the tab to a screw hole in each bus bar using #4 or #6 flat head screws. Where a lower portion of the same side group is also wired to a branch circuit, as shown in FIG. 6, a horizontal tab 236 is also connected between a hot bus bar of the middle group and a corresponding hot bus bar in the lower portion of the side group. It is to be understood that since the middle bus bars are wired with 220 VAC power, the side circuits used for 110VAC branch circuits may be supplied power from either the hot or alternative hot bus bar of the middle group. For example, the horizontal tabs 236 of upper and lower circuits may each be fastened to the hot bus bar of the middle group, or the upper and lower bus bars of the side group may be connected to the hot and alternative hot bus bars of the middle group respectively.

Horizontal tabs 236 may also be connected depending on the type of electrical unit 100 to be used with the electrical box 200. For example, where the electrical unit 100 requires power from the hot and alternative hot bus bars of the upper and lower portions of each side group, four horizontal bus bars route power from the middle group to the side groups as shown in FIG. 7. In addition, vertical tabs 237 may be used to route power between upper and lower portions of a side group where isolation of the upper and lower portions is not needed.

Once the horizontal tabs 236 and vertical tabs 237 have been installed in the interior of the electrical box 200 as necessary, a switching unit 100 is mated with the electrical box 200 as discussed above. A decorative cover plate is then added to cover the electrical unit 100 and seating lip 212 of the electrical box.

Thus, in wiring a new construction building using an electrical box 200 and electrical unit 100 of the present invention, the electrical wires of the existing cable are quickly connected to the electrical box by punching the wires down onto the IDCs with minimal cutting and stripping of the wires. Moreover, the redundant IDCs provide a reliable gas tight electrical connection without the possibility of nicking that exists when stripping wires. Finally, by using the conductive member and conductive finger mating system, no wires enter the interior of the electrical box leaving more room for larger electrical units having more functions that may be planned for in a new construction home.

The present invention also provides an improved way of replacing an electrical unit that is broken or does not provide the desired electrical functions to a user. As discussed above, replacing conventional electrical units may be problematic because wires often break during removal from the unit to be replaced making it difficult or impossible to connect the wires to the new electrical unit without first extending the wires by splicing. An electrical unit according to the present invention can be replaced by simply removing the decorative cover plate and un-mating the electrical unit 100 from the electrical box 200. This is preferably accomplished by unscrewing mating screws 111 from screw holes 215. The head of each screw 111 is attached to the electrical unit 100 such that unscrewing pulls the electrical unit 100 apart from the electrical box 200. A new electrical unit 100 is then aligned with the electrical box 200 such that the sockets 116 align with the conductive members 233. Screws 111 are then mated with screw holes 215 and rotated to pull the electrical unit 100 into mating contact with the electrical box 200 as described above.

According to the present invention, a variety of modules may be plugged into the electrical box 200 or 200' in order to achieve a variety of electrical functions. FIGS. 11A through 11E depict typical electrical units 100 used with an electrical box 200 or high current electrical box 200' according to the present invention. The various electrical units 100 all have mating screws located on the top and bottom of the unit to pull the electrical unit 100 into mating contact with the electrical box 200 as previously discussed. Mounting holes for screws that hold on the decorative cover plates are omitted for clarity.

Figure 11B:
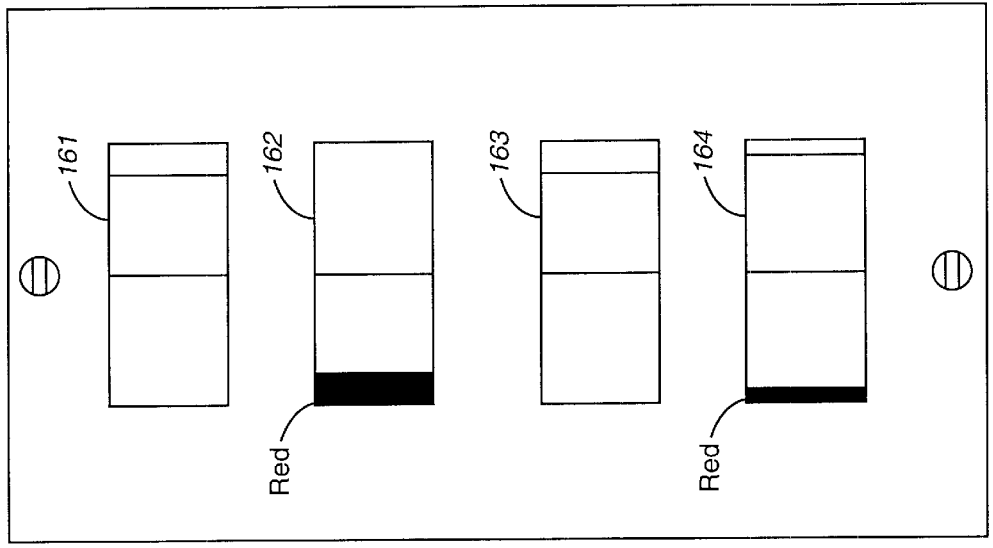
FIGS. 11A through 11E are front face views of electrical units according to an embodiment of the present invention.
Figure 11A:
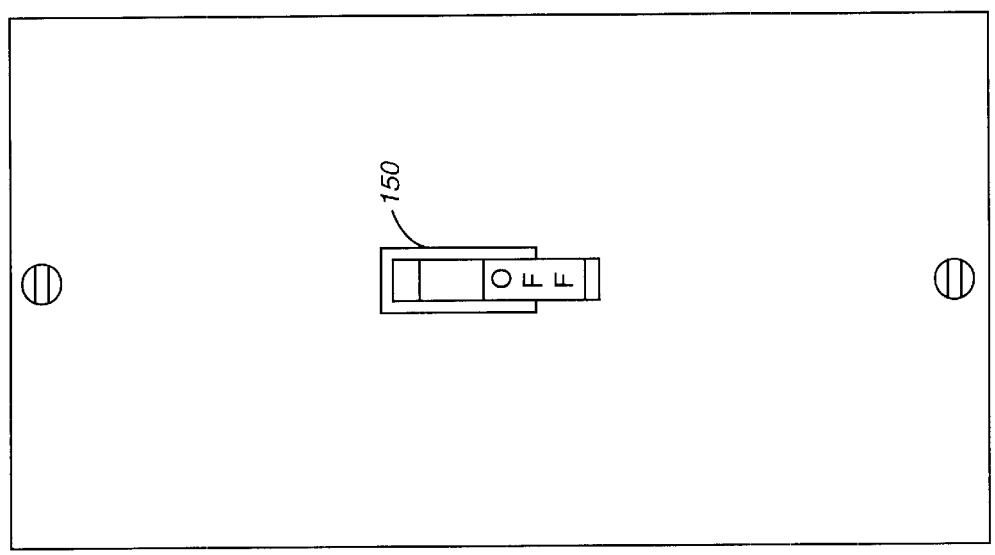

As seen in FIG. 11A the electrical box may be used with a standard switch 150 to switch electrical power to a light or other electrical appliance. The switch 150 may switch 110VAC or 220VAC power of high or low current depending on the capacity of the electrical unit itself and the configuration of the electrical box the unit is plugged into.

FIG. 11B shows a quad switch or circuit breaker electrical unit that may be used with the electrical box 200 or high current electrical box 200'. The circuit breaker version preferably has one side showing red if the breaker is off or tripped. In FIG. 11B, the first breaker 161 is on, the second circuit breaker 162 is off, the third circuit breaker 163 is on, and the fourth circuit breaker 164 is tripped or halfway between on and off. Each circuit breaker can optionally have lighted indicators for indicating on, or off/tripped.

Figure 11C:
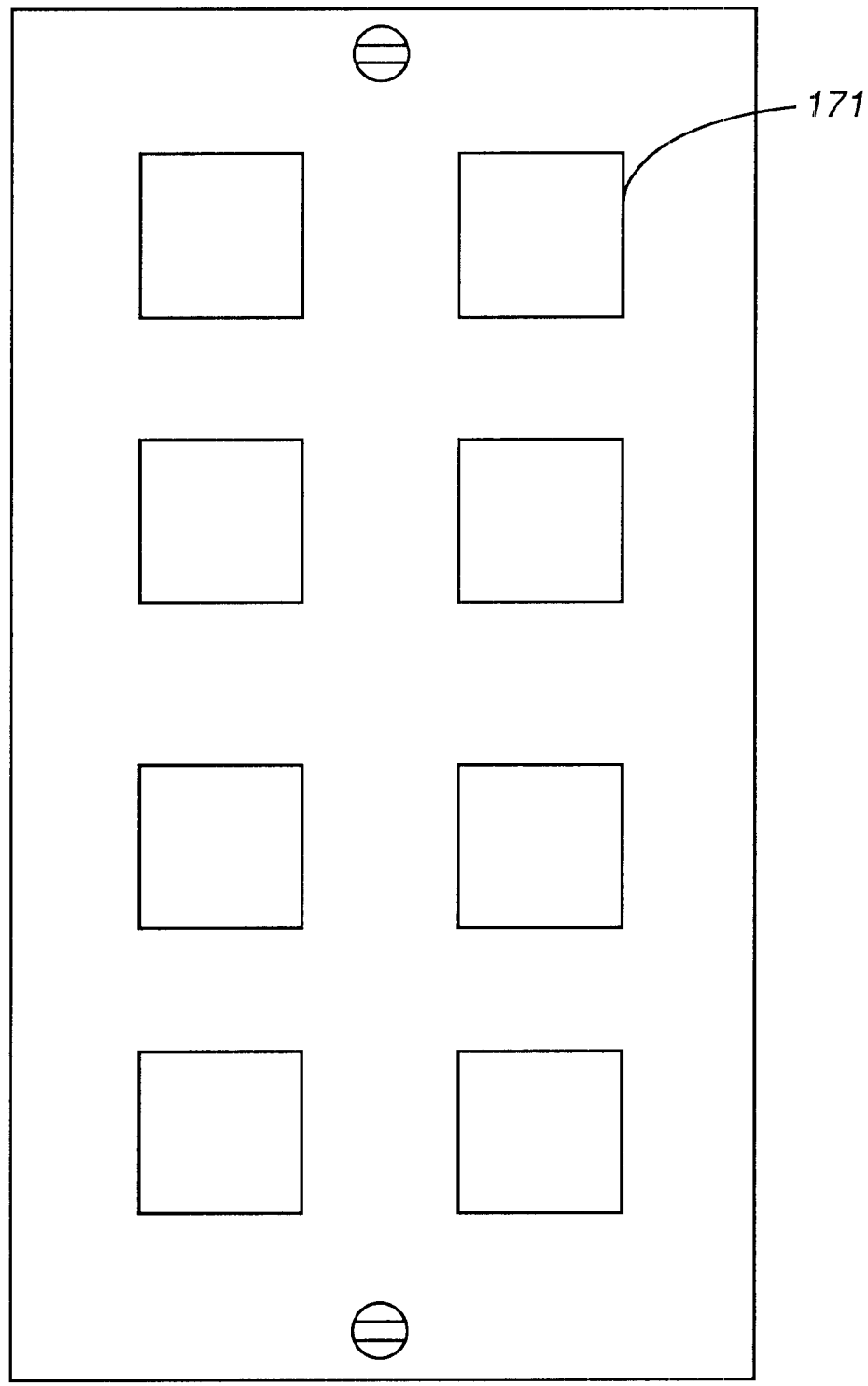

FIG. 11C shows an eight switch/circuit breaker electrical unit used with an electrical box 200 according to the present invention. The eight switch/breaker module can only be used in areas where 110VAC service is used such as in the U.S. Each switch 171 depicted as a square in FIG. 11C is a push button switch that can optionally be lighted when on or off.

Figure 11E:
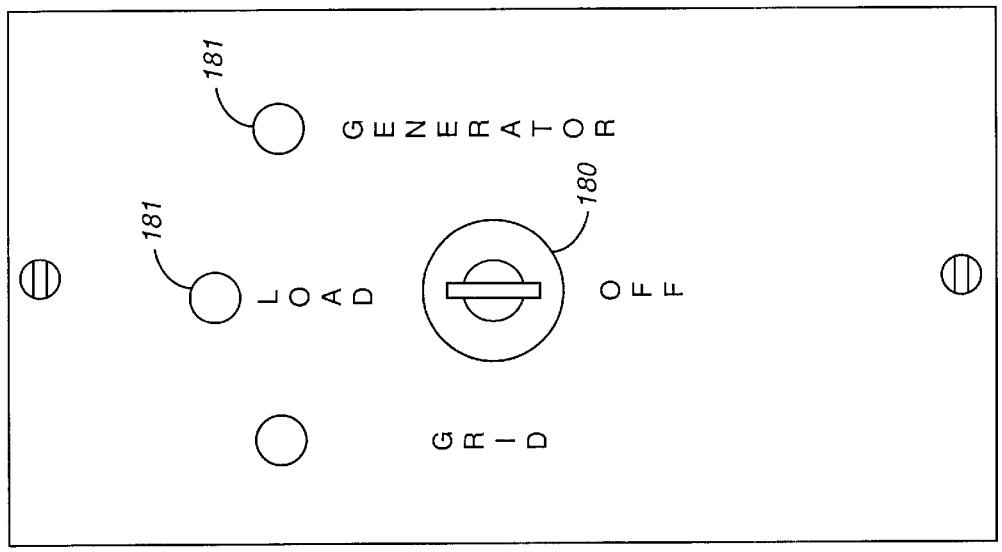
Figure 11D:
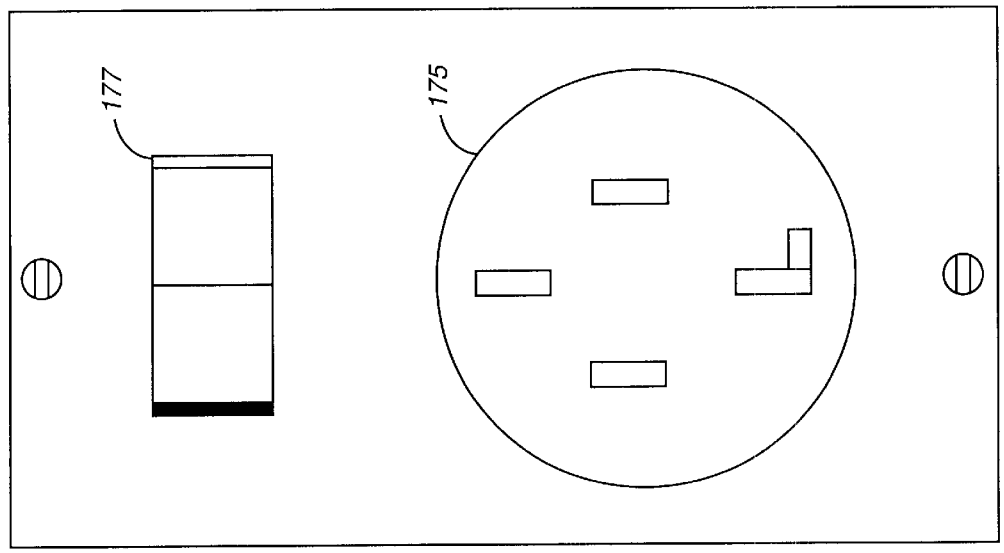

Figures 11D is a high current outlet 175 useful for clothes dryers, high power shop tools, and other high current applications. An optional circuit breaker 177 is shown above the outlets in the tripped position as described with respect to FIG. 11c. The electrical unit of FIG. 11D may also have ground fault circuit interrupt (GFCI) built into the circuit breaker and/or be lighted.

FIG. 11E is a transfer switch module with a three position, dual pole switch 180. The switch is shown in the off position. When pushed to one side or the other, a set of side bus bars of the electrical box 200 to which the unit is mated is connected to the center bus bars. Optional lamps 181 above each indicator show if the grid, the load, and the generator are energized. The transfer switch 180 can handle up to 60 A loads for a normal electrical box or up to 100 A loads for a high current electrical box. One side group of a the electrical box 200 is connected to the grid while the other side group is connected to the generator or other alternate power source. The center group will go to the load. A double pole double throw (DPDT) center off switch should be used to provide the transfer function. From these examples, it will be clear to one of ordinary skill in the art that an electrical unit that performs any one of a variety of known functions can be used in accordance with the present invention.

Figure 12:
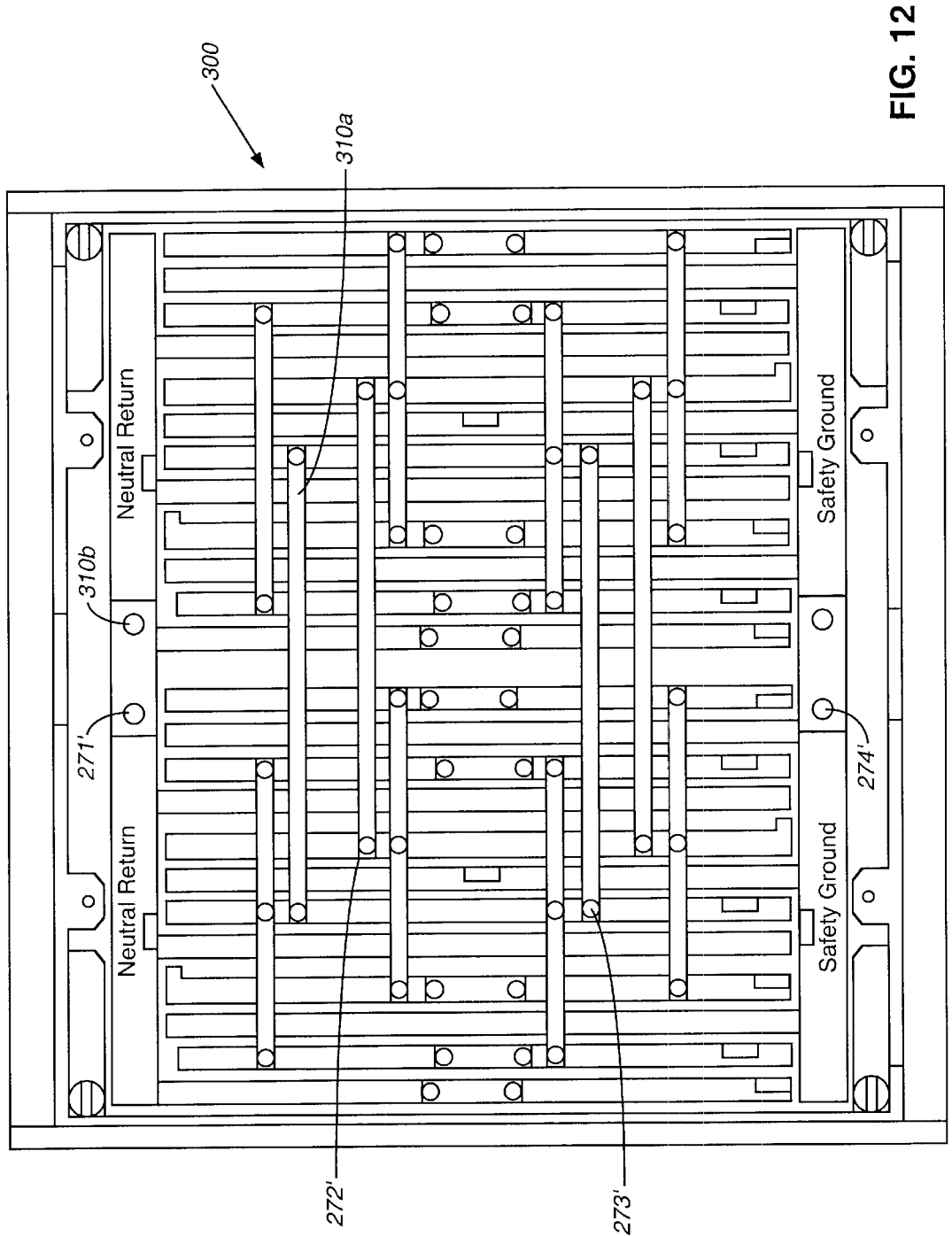
FIG. 12 is a front view of a multi gang electrical box in accordance with an embodiment of the present invention.

FIG. 12 is a front view of a multi-gang box 300 according to the present invention. The multi-gang box 300 is shown as two of the electrical boxes of FIG. 7 mounted adjacent to one another with the common sidewalls 209b and overlapping seating lips 241 removed from the electrical boxes so as to form a single cavity. While the gang box 300 is shown as an integral unit, the gang box 300 may be separate electrical boxes placed adjacent to one another and interconnected in accordance with the present invention to form a multi gang electrical box. In this situation, the adjacent sidewalls 209b may be removed or include openings through which interconnections between boxes may be made. Moreover, it is to be understood that any number of electrical boxes may be placed adjacent to one another and interconnected to form a multi-gang electrical box in accordance with the present invention. The multi-gang box 300 includes removable gang tabs 310 that span across gangs. The hot to hot or alternate hot to alternate hot gang tabs 310a are fixed to the screw holes 271–274 as discussed with respect to FIG. 7 and connect the black and red bus bars of the center groups of each electrical box together. The safety ground and neutral return horizontal bus bars are also connected across gangs with tabs. All the horizontal tabs can be removed if desired. All hot-to-hot horizontal tabs that span between gangs can carry 60 A and ground to ground horizontal tabs carry 100 A, even though the vertical bus bars are only capable of carrying 40 A to them. This is because the high current electrical box will also use the same horizontal tabs, thus saving on manufacturing costs by using the same design.

Obviously, numerous modifications and variations of the present invention are possible in light of the above teachings. It is therefore to be understood that within the scope of the appended claims, the invention may be practiced otherwise than as specifically described herein. For example, while the specification discloses that electrical connection is made by a socket and finger configuration, it is to be understood that a pin and socket configuration may also be used.

What is claimed is:

1. An electrical junction box adapted for use with an un-severed multi-conductor cable, comprising:
   a container having an open end, an interior surface defining an interior space, and an exterior surface;
   a plurality of conductive members mounted within said interior surface and adapted to be coupled to respective contacts of an electrical unit inserted into said opening;
   a plurality of longitudinal bus bars mounted on said exterior surface and in electrical contact with respective of said conductive members, each of said bus bars corresponding to a wire of a multi-conductor cable;
   a plurality of alternative bus bars mounted on said exterior surface, each of said alternative bus bars corresponding to and coupled to one of the longitudinal bus bars; and
   a plurality of rows of insulation displacement connectors, each row of said insulation displacement connectors mounted along a corresponding one of said bus bars and arranged to receive a corresponding wire of said multi-conductor cable passing un-severed over said exterior surface of said electrical junction box.

2. The electrical junction box of claim 1, further comprising:
   high current wire clamps mounted on said bus bars and configured to receive high current wires of said multi-conductor cable.

3. The electrical junction box of claim 1, wherein said insulation displacement connectors, bus bars, and conductive members define a circuit of said electrical junction box, and said electrical box further includes a plurality of said circuits.

4. The electrical junction box of claim 3, further comprising:
   removable tabs mounted on said interior surface of said container and configured to electrically connect bus bars of one of said plurality of circuits to bus bars of another one of said plurality of circuits, wherein electrical power connected to said one of said circuits is transferred to said other one of said circuits through said removable tabs, such that branch circuits may be routed from said electrical junction box.

5. The electrical junction box of claim 1, wherein said conductive members comprise rigid conductive fingers that protrude from said bus bars such that said contacts of said electrical unit mate with said conductive fingers when said electrical unit is mated with said electrical junction box.

6. The electrical junction box of claim 5, wherein said bus bars comprise neutral and hot bus bars, said contacts comprise neutral and hot contacts, and a conductive finger connected to said neutral bus bar is oriented in a first direction, a conductive finger connected to said hot bus bar is oriented in a second direction, and said conductive finger connected to said neutral bus bar mates with said neutral contact of said electrical unit configured to receive said conductive finger oriented in said first direction and said conductive finger connected to said hot bus bar mates with said hot contact of said electrical unit configured to receive said conductive finger oriented in said second direction when said electrical unit is mated with said electrical junction box.

7. The electrical junction box of claim 1, further comprising a cable clamp mounted on said exterior surface of said container and configured to clamp said multi-conductor cable to said container in order to relieve mechanical stress on said insulation displacement connectors when said wires of said multi-conductor cable are fixed to said insulation displacement connectors.

8. The electrical junction box of claim 7, further comprising a cover plate removably fastened to said exterior of said container and configured to cover said cable clamp and said wires of said multi-conductor cable fixed to said insulation displacement connectors.

9. The electrical junction box of claim 8, wherein said cover plate is configured such that said cover plate will not mount on said exterior of said container unless said wires of said multi-conductor cable are fixed to said insulation displacement connectors.

10. The electrical junction box of claim 1, wherein said container further comprises:

a seating lip positioned along a perimeter of said open end to define a seating perimeter defining an area larger than an area defined by said perimeter of said open end;

a fastening paddle rotatably mounted in said interior space of said container; and a sidewall opening in said container positioned adjacent to said fastening paddle such that when said fastening paddle is rotated, a portion of said fastening paddle protrudes through said sidewall opening to an exterior of said container and opposing said seating lip, wherein when said container is recessed in a wall opening having an area larger than said area defined by said opening perimeter and smaller than an area defined by said seating perimeter, said fastening paddles rotate to said protruding position so that said wall is fastened between said seating lip and said fastening paddle.

11. The electrical junction box of claim 1, further comprising:

alternative insulation displacement connectors mounted on said alternative bus bars and configured to receive corresponding wires of a multi-conductor cable; and alternative conductive members mounted on said interior surface of said container and electrically connected to said alternative bus bars, said alternative conductive members being configured to connect to alternative contacts of said electrical unit.

12. The electrical junction box of claim 1, further comprising:

gang connections connected to said bus bars and configured to receive ends of conductive jumper tabs, wherein when two electrical junction boxes are positioned adjacent to each other, said conductive jumper tabs are fastened from said gang connections of one of said electrical boxes to gang connections of the other of said electrical junction boxes, such that electrical power is transferred from said one of said electrical junction boxes to the other of said electrical junction boxes via said conductive jumper tabs.

13. The electrical junction box of claim 12, wherein said gang connections include gang screw holes, and said conductive jumper tabs are fastened from gang screw holes of one of said electrical junction boxes to gang screw holes of the other of said electrical junction boxes.

14. An apparatus for use with an un-severed multi-conductor cable, comprising:

a container having an open end, an interior surface defining an interior space, and an exterior surface;

a plurality of conductive means mounted within said interior surface for coupling to respective contacts of an electrical device means inserted into said opening;

a plurality of primary bus bars for distributing electrical power mounted on said exterior surface and in electrical contact with respective of said conductive means, each of said primary bus bars corresponding to a wire of a multi-conductor cable;

a plurality of alternative bus bars for distributing electrical power mounted on said exterior surface, each of the alternative bus bars in electrical contact with a corresponding one of the primary bus bars; and a plurality of means for connecting a corresponding primary bus bars to said wire of said multi-conductor cable through multiple places in insulation surrounding said wire, each of means for connecting mounted along said corresponding primary bus bar and arranged to receive said corresponding wire of said multi-conductor cable passing un-severed over said exterior surface of said apparatus.

\* \* \* \* \*